A. Pepple,

Cornice.

No. 4,077. Reissued July 19. 1870.

Inventor.
Anthony Pepple
by his Attorney
Abel T. Atherton.

Witnesses.
Albert M. Moore,
J. Henry Paige.

N. PETERS, PHOTO-LITHOGRAPHER, WASHINGTON, D. C.

United States Patent Office.

ANTHONY PEPLE, OF EAST BILLERICA, MASSACHUSETTS.

*Letters Patent No.* 101,158, *dated March* 22, 1870; *reissue No.* 4,077, *dated July* 19, 1870.

IMPROVEMENT IN THE MODE OF ATTACHING CORNICES TO WINDOWS.

The Schedule referred to in these Letters Patent and making part of the same.

I, ANTHONY PEPLE, of East Billerica, in the county of Middlesex and Commonwealth of Massachusetts, have invented a new and useful Mode of Attaching or Hanging Cornices, which can be advantageously hung or attached in the manner hereinafter described, of which the following is a specification.

Figure 1:
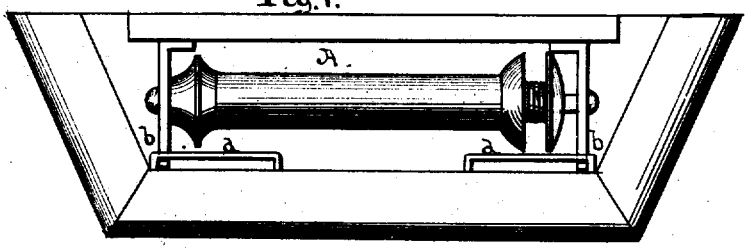
Figure 1 represents a plan of attaching cornices to windows by my improved method.
Figure 2:
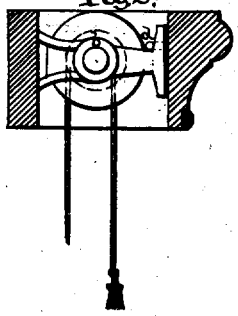
Figure 2 represents a cross-section of my said improved method.

Fig. 1, A represents an ordinary curtain-roller, and *b b* the brackets which uphold the same, these brackets being the same as those commonly in use, except that they have a T-shaped extension, said extension operating as a hook and a bearing for the purpose of attaching or hanging a cornice.

As illustrated in fig. 1, one or more staples or clasps, *d d*, are fixed, by means of which the said cornices are firmly affixed to the brackets *b b*. These staples are of such length that the said cornice may be adjusted endwise.

The use, heretofore, of a cornice has been for supporting curtain-drapery, but my invention is used for concealing a curtain-roller and the bracket connected therewith.

I do not claim the adjustability of said cornices by the method patented by O. L. Gardner, April 20, 1869, as said Gardner's invention relates to a certain kind of a cornice formed of two or more parts, while my invention relates to a cornice formed of but one part, which, as will be readily perceived, cannot be made adjustable in the manner proposed by said Gardner's method.

I claim as my invention—

1. Applying a cornice or other ornament to a window in such manner that it shall serve to conceal the curtain-roller, as set forth.

2. The application of the T-shaped extension of a bracket for a curtain-roller, substantially as described, and for the purpose set forth.

3. The application of a cornice by means of one or more staples or clasps, or said extended bracket, so that the said cornice may be adjustable endwise, substantially as described, and for the purpose set forth.

Witnesses: ANTHONY PEPLE.

SAM. P. RUSSELL,
ALBERT M. MOORE.